United States Patent Office 3,021,049
Patented Feb. 13, 1962

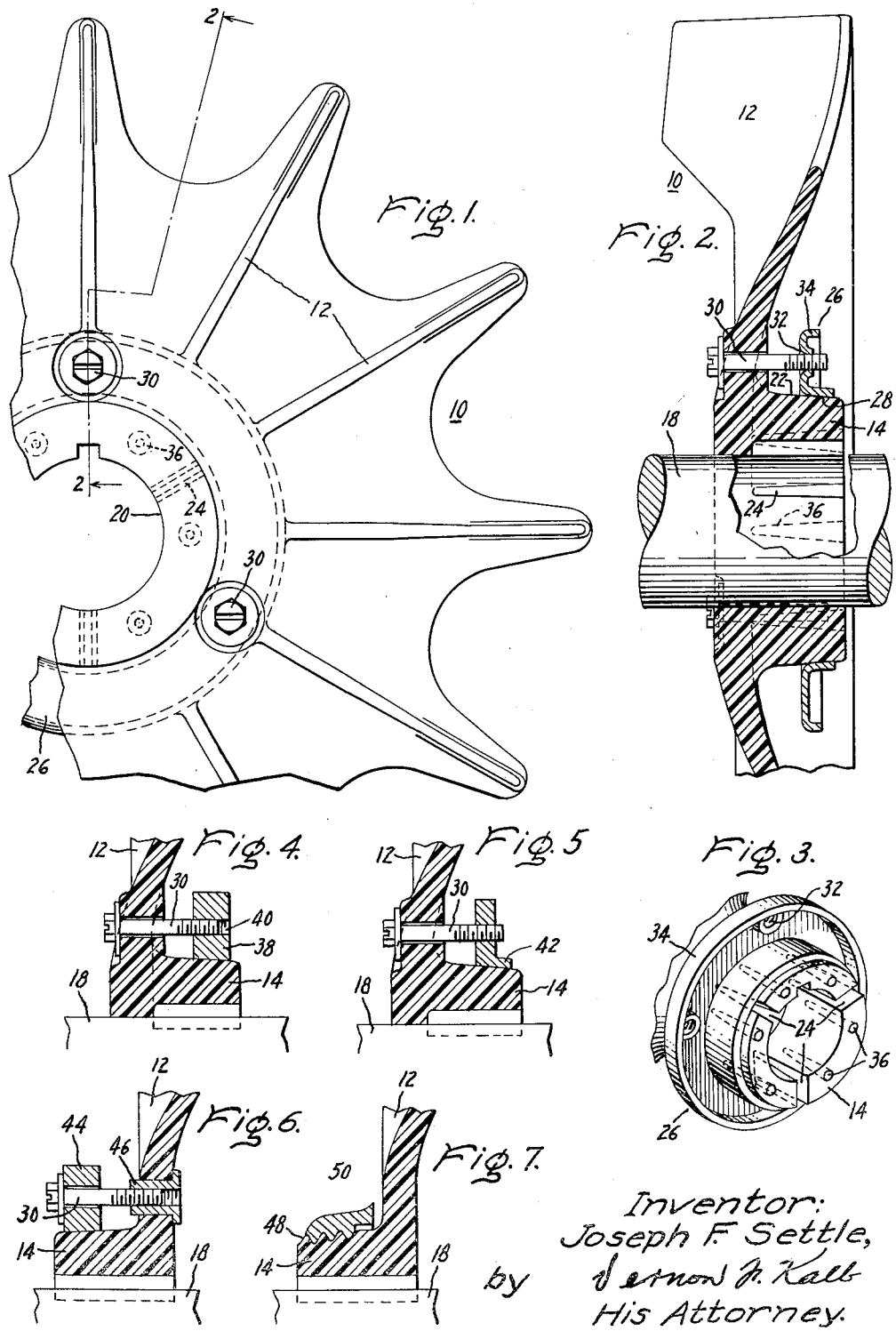

3,021,049
TAPERED CLAMPING RING FOR FAN AND
IMPROVED HUB DESIGN
Joseph F. Settle, Scotia, N.Y., assignor to General Electric Company, a corporation of New York
Filed Jan. 31, 1957, Ser. No. 637,389
6 Claims. (Cl. 230—134)

The invention described herein relates to dynamoelectric machines and more particularly to an improved clamping arrangement for attaching a fan hub to the shaft of rotating machines.

Numerous devices are currently employed for fastening a fan hub to its supporting shaft in a dynamoelectric machine and one of the most prevalent types used consists of a clamping arrangement wherein bolts are provided on either one or opposite sides of the shaft for exerting the force necessary in obtaining a secure fit. This type of fastening means subjects the hub to possible fracture in the event too great a force is applied to the bolts, while other clamping arrangements contain a multitude of parts or involve elaborate procedures in assembly which tend to increase the cost of manufacture.

Hubs of various sizes currently used are designed to fit their respective shafts only, thereby requiring a separate set of dies for each hub rather than having one set of dies adaptable to a wide range of hub diameters. Also, optimum hub design calls for smooth surfaces not susceptible of gathering dirt, lint or other foreign particles which hinders air flow over the heat producing surfaces of the machine.

It therefore is an object of my invention to provide a hub capable of eliminating the above noted disadvantages while retaining simple design features to permit manufacture at low cost and to assure complete clamping action with the shaft.

In carrying out the above object of my invention, I provide an integrally cast blade and hub structure made of metal or organic material and having slots in the hub arranged to extend axially of the shaft for facilitating the clamping action thereon. A clamping ring of metal or other deformable material is designed to fit over a tapered exterior surface of the hub so that upon tightening of the ring, the slots permit the hub to effect a firm locking action with the shaft thereby preventing relative movement of these parts during operation of the machine. The hub structure is further designed in a manner to permit the use of a single die for providing hubs of different internal diameters within a predetermined range of sizes.

The subject matter which I regard as my invention is particularly pointed out and distinctly claimed in the concluding portion of this specification. My invention, however, both as to organization and method of operation, together with further objects and advantages thereof may best be understood with reference to the following description taken in connection with the accompanying drawing in which.

FIGURE 1 is a view in elevation of a fan including blades and a hub adapted for mounting on a shaft of a machine;

FIGURE 2 is a view taken on lines 2—2 of FIGURE 1;

FIGURE 3 is a perspective view of the fan shown in FIGURES 1 and 2 and illustrate the arrangement of the clamping ring and hub immediately prior to anchoring the latter on a shaft; and FIGURES 4 through 7 illustrate various modifications of the clamping ring arrangement shown in the preceding figures.

Referring now to the drawing wherein like reference characters designate like or corresponding parts throughout the several views, there is shown in FIGURES 1 through 3 a cast or molded fan structure 10 made of organic material to permit continuous operation in corrosive laden atmospheres. The fan comprises blades 12 and a hub 14 provided with a central opening for receiving the shaft 18 of a dynamoelectric machine. As shown in these figures, the major portion of the hub 14 is located on the inner or motor side of the fan structure so as to have the outer surface thereof present a smooth surface to the flow of air thereover and to preclude the gathering of lint or other foreign particles on otherwise protruding parts. This design further permits the optimum utilization of space within the frame or housing of the machine. The hub comprises a cylindrical member having a smooth internal bore 20 adapted to snugly fit with shaft 18, while the outer surface of the hub is provided with a tapered portion 22 which merges into each of the fan blades 12 integrally formed therewith.

As more clearly shown in FIGURE 3, a plurality of slots 24 are provided in the hub which extend axially thereof to a point adjacent the forward end. In order to rigidly attach the above described hub structure to the shaft, a cylindrical clamping ring 26 having a tapered inner surface 28, mates with the tapered surface of the hub and is adapted to be pulled upwardly on the tapered surface 22 by bolts 30 engaging threaded openings 32 formed at appropriate points in the ring 26. A reversely bent lip 34 is provided on the ring periphery for providing the required stiffness to draw the ring up along the hub, yet retaining enough flexibility to provide spring action for aiding in the self-locking of the ring on the tapered hub surface. The ring therefore constitutes a combined locking and tension take-up device.

In operation, with the parts as assembled in FIGURE 2, the bolts 30 are drawn up with equal pressure to pull the ring 26 upwardly on the tapered surface 22, and in so doing, compresses the hub portions between the slots into a firm and fixed relationship with the shaft. The continued application of force to the bolts causes the ring to deform adjacent its outer surface with the result that a self-locking action is obtained. After a fan structure mounted in the manner described is placed in operation on a motor shaft, the parts ultimately will settle into a more permanent position, and in some cases, may tend to become loosened on the shaft. However, because of the deformation in the ring 26, the possibility of the bolts 30 working loose is remote because of the self-locking effect achieved. Also the spring action of the flange tends to cause it to pull up on the hub and take up any looseness which may develop due to relaxing of the molded hub.

In order to employ a single die for producing hubs of different diameters, a round bar having a diameter equal to the shaft dimension desired, is placed in a mold provided with protuberances which form the slotted portions 24 in the hub. If the hub internal diameter is large, and therefore adapted for installation on a large shaft, fan material is placed in the mold and the fan cast or molded under pressure in the usual manner. However, in the event a hub of smaller diameter is desired, while utilizing the same mold, a bar equal to the shaft diameter is placed in the mold as described above. However, since the body of the hub will be thicker and therefore comprise a greater amount of material, a plurality of pins are spaced around the bar so that when the molten material is poured into the mold, the pins will serve to conduct the heat away from the hub at a rate substantially equal to that of the blades. The various portions of the fan are therefore cured more evenly, thus eliminating uncured sections or crack producing stresses which otherwise would appear in the structure from overcuring of the thin sections. Upon removal of the fan from the mold, a plurality of holes 36 will appear in the hub where the pins were located, and these also serve to permit deflection of the hub sections when it is clamped to the shaft by ring 26. Obviously, the fan adapted to be cast or molded in the mold having the smallest shaft will utilize a large number of pins for carrying heat into the fan hub while the largest will employ the least number or none at all. In order to remove the fan from the shaft, the bolts 30 are backed off slightly to a loose position and it has been found that mild tapping by a mallet on the exposed head of the bolts is sufficient to break the hub loose from its rigid fit with the shaft.

The modification shown in FIGURES 4 and 5 is the same as that previously described except that the ring is of a slightly different shape; the ring 38 in FIGURE 4 being of conventional construction with a plurality of threaded openings 40 extending axially through the wall thereof while the ring in FIGURE 5 is provided with an additional portion 42 for increasing the contact area with the outer surface of the hub.

In FIGURE 6, the hub extends outwardly on the air inlet side of the fan and is tapered as in the previous modifications. The ring 44 is the same as that shown in FIGURE 4 and in order to secure a rigid connection, an insert 46 is provided at a point where the hub merges into the fan blades.

In FIGURE 7 the tapered portion of the hub is equipped with a screw thread 48 which mates with a tapered thread formed on the inner surface of a ring 50. The exterior surface of the ring is preferably shaped to blend with the fan surface in order to obtain improved air flow characteristics.

It will be evident that in all of these modifications, the concept disclosed is that of providing slots axially in the hub while a tapered portion is formed on the outer surface engageable by a ring which is drawn onto the tapered surface for compressing the hub on the shaft.

It will be evident that many modifications and variations are possible in light of the above teachings. It therefore is to be understood that within the scope of the appended claims, the invention may be practiced otherwise than as specifically described.

What I claim as new and desire to secure by Letters Patent of the United States is:

1. An air impeller adapted for mounting on a machine shaft comprising a hub having a plurality of blades inseparably cast therewith and extending radially therefrom, a generally tapered exterior surface on said hub having axial slots therein and a clamping ring having a like tapered surface arranged for mating contact therewith, and a plurality of bolts extending axially through a portion of said hub and into said ring for drawing the latter onto said tapered surface and thereby compressing said hub on said shaft.

2. A fan for a dynamoelectric machine shaft comprising blades and an inseparably connected hub made from a non-metallic molding compound and having an axial length less than the width of the blades, said hub comprising a radially protruding portion equipped with an exterior surface tapered to a slight angle with said shaft, a plurality of slots in said hub, and a combined locking and tension take-up device on said tapered surface, bolts extending axially through said hub and terminating in said device so that when the bolts are tightened, the device is moved upwardly on the tapered surface of the hub thereby compressing it thereon and preventing subsequent relative movement between the hub and the shaft.

3. The combination according to claim 2 where said device comprises a cylindrical member having threaded openings placed at predetermined points in a wall thereof, and a bolt extending axially through a portion of the hub for each of the threaded openings so that upon tightening of the bolts in the openings, the device is drawn upwardly on said tapered surface to effect tightening of said hub on the shaft and simultaneously obtaining a distortion of said device to achieve a self-locking action with the bolts.

4. The combination according to claim 2 wherein said radially protruding portion extends forwardly into the air stream for said fan, an internally threaded insert spaced from said ring and fixed in a portion of said hub so that bolts extending through said ring are caused to engage said threaded portion to effect tightening of said hub on the shaft.

5. The combination according to claim 2 wherein said exterior surface is provided with threads and said ring is likewise equipped with a mating threaded portion so that upon turning said ring on the exterior surface, the hub is caused to be tightened on said shaft.

6. A fan for a dynamoelectric machine comprising blades and an inseparably connected hub made from a non-metallic molding compound and having its axial length falling within planes transverse to the hub and on each side of the blades, said hub comprising a radially protruding portion equipped with an exterior surface tapered to a slight angle with a shaft on which it is adapted for mounting, a plurality of slots in said hub, a number of axially extending holes formed by the walls of said hub for assisting in providing an area which facilitates clamping said hub onto said shaft, and a combined locking and tension take-up device on said tapered surface designed in a manner to compress the hub on said shaft when the device is moved upwardly on the tapered surface by an exterior force.

References Cited in the file of this patent

UNITED STATES PATENTS

| | | |
|---|---|---|
| Re. 4,288 | Buckman | Mar. 7, 1871 |
| 234,343 | Stedman | Nov. 9, 1880 |
| 1,571,735 | Queisser | Feb. 2, 1926 |
| 2,001,675 | Eisgruber | May 14, 1935 |
| 2,168,469 | Brouwer | Aug. 8, 1939 |
| 2,405,329 | Ruebensaal | Aug. 6, 1946 |
| 2,464,082 | Hart | Mar. 8, 1949 |
| 2,487,128 | Hahn | Nov. 8, 1949 |
| 2,581,872 | Morrison | Jan. 8, 1952 |
| 2,669,471 | Breslow | Feb. 16, 1954 |
| 2,726,106 | Honck | Dec. 6, 1955 |
| 2,869,237 | Berge | Jan. 20, 1959 |
| 2,869,774 | Smith et al. | Jan. 20, 1959 |